Patented Aug. 14, 1945

2,382,342

UNITED STATES PATENT OFFICE 2,382,342

CHLORINATION OF RUBBER

Edwin B. Spaulding, Madison, Wis., assignor to Hercules Powder Company, Wilmington, Del., a corporation of Delaware No Drawing. Application December 31, 1942,
Serial No. 470,831

4 Claims. (Cl. 260—772)

This invention relates to a method for the production of chlorinated rubber and more particularly it relates to a method of preparing chlorinated rubber of a definite predetermined viscosity.

For many purposes it is desirable to obtain chlorinated rubber of a definite predetermined viscosity. Thus, for example, in making lacquers, paints, varnishes, and the like, it will usually be desirable to have a chlorinated rubber of low viscosity controlled in each case at a desired value.

Various means have been devised for reduction of viscosity in chlorinated rubbers, including prolonged milling of the rubber, oxidation preceding chlorination, treatment with hypochlorites during or preceding chlorination, irradiation and treatment with oxygen during the entire chlorination in admixture with the chlorine or alternately with chlorine. Prolonged milling is uneconomical, insufficiently effective, and leads to undesired depolymerization; in general, the various methods of viscosity reduction have been partly uneffective and difficult of control with the exception of the method described in Patent No. 2,182,456. By that method, chlorination is carried out in solution at a temperature below 60° C. to obtain a syneresis or "break" involving formation of a two-phase system, viscosity reduction and control being obtained by addition of oxygen and regulation of the length of the "break" period.

The "break" control method requires the formation of the two-phase system so that regulation thereof may provide control of viscosity, the "break" in turn requiring chlorination at temperatures below 60° C. since it is not obtained otherwise. I have found, however, that there are distinct advantages in chlorinating rubber in solution at temperatures in the range between about 64° C. and about 76° C., particularly at about 68–72° C., in that more rapid chlorination, easier and more effective agitation, and efficient heat removal with better temperature control are obtained. Also, formation of the two-phase system is avoided, making for more uniform reaction during the period of its existence. Under these conditions, a product of high uniformity, good flexibility and minimum degradation is obtained. However, elimination of the "break" also carries with it control of viscosity to predetermined values by manipulation of the "break" period and oxidation therein.

It has now been found that if a 1–6% solution of rubber in an inert solvent, carbon tetrachloride particularly, is chlorinated at a temperature which is initially 64–76° C., or which reaches 64–76° C. shortly after the chlorination is started, with such extraction of heat as is required to hold the solution in the 64–76° C. range in a first reaction stage, the reaction occurs in single phase throughout but takes place in stages which can be identified. The first reaction stage is characterized by high absorptive power for chlorine, by a relatively high rate of heat evolution, and by a relatively high rate of evolution of hydrogen chloride. Chlorination in the first stage is continued until the chlorine content of the partially chlorinated rubber is between 45% and 59%, usually between 48% and 55%. The first reaction stage comes to an end in this range, the change being determined by a sharp drop in rate of heat evolution, accompanied by a sharp drop of about 2 to 5° C. in temperature when heat extraction is maintained substantially constant. However, there is no change in phase composition or "break," as at lower temperatures. The change is further characterized by a drop in evolution of hydrogen chloride and a drop in chlorine absorbing power.

It has been found that if an oxygen-containing gas is fed concurrently with chlorine in a second stage following the end of the first stage reaction, the oxygen is particularly effective in reducing viscosity, and is more effective than when a break is induced. The mixture of oxygen and chlorine is passed into the reaction solution until the viscosity of the chlorinated rubber has been reduced so that the product recovered from the solution has a predetermined viscosity. In most cases, the addition of oxygen with the chlorine is continued to the end of the chlorination, i. e., until the desired chlorine content above 64% is attained. The temperature in the second stage will be above 60° C. but not higher than 76° C., any drop below 64° C. being for a relatively short period between the end of the first stage and regain of the temperature drop to the 64–76° C. range. The viscosity drop is controlled by control of the quantity of oxygen added and also by control of the period extending from the end of the first stage to a point in the second stage at which the temperature drop is regained and the reactivity and chlorine absorbing power are increased. Most rapid regain of temperature, reactivity, and chlorine absorbing power leads to lowest viscosity products since the effectiveness of the oxygen is at its maximum in the period following the regain point. Regain is effected by discontinuing extraction of heat, thus permitting heat of reaction to raise the temperature, or actually adding heat in some cases, preferably feeding at least as much chlorine as the solution can absorb. Thus, by regulation of the temperature of the reaction mixture following the critical point at the end of the first reaction stage, and by regulation of the rate and duration of the oxygen addition, viscosity drop is held under control.

Accordingly, the process of this invention comprises chlorinating a solution of rubber, in a solvent for both rubber and chlorinated rubber substantially inert to chlorine, in a first reaction stage at a temperature of 64–76° C., with removal of heat in an amount to maintain the temperature at 64–76° C. for substantially the full period of the first stage or at least in the second half thereof, until the end of the first stage is reached at a point at which the partly chlorinated rubber has a chlorine content between about 45% and about 59% and at which the nature of the reaction changes as hereinabove described; and in a second stage following this point subjecting the reaction solution concurrently to chlorine and an oxygen-containing gas, the addition of both chlorine and oxygen being continued until the chlorinated rubber has a desired predetermined viscosity, and the chlorination being continued until the desired chlorine content above 64% is reached.

The general process which has been described is illustrated by the specific examples thereof which follow. In the examples, all parts are by weight.

Example 1

To 400 parts of rubber (digested according to the method of Peterson, U. S. Patent 2,252,728) dissolved in 9500 parts of carbon tetrachloride and placed in a jacketed, glasslined, anchor-agitated vessel provided with chlorine feed line and vapor exhaust line, and reflux coolers, chlorine gas and air were introduced according to the following schedule:

| Time | Rate of Cl$_2$ addition | Rate of air addition | Solution temp. | Remarks |
|---|---|---|---|---|
|  | Parts/hour | Parts/min. | ° C. |  |
| 0 hour | 225 |  | 47 |  |
| 1 hour | 225 |  | 67 | Fed cooling water in jacket. |
| 2 hours | 225 |  | 68 |  |
| 3 hours | 225 |  | 71 |  |
| 3¼ hours | 200 |  | 71 |  |
| 3½ hours | 200 | 18.5 | 69 | Cooling water shut off jacket. Period of reduced temperature maintained about one hour. |
| 4 hours | 200 | 18.5 | 67 |  |
| 4½ hours | 200 | 18.5 | 72 |  |
| 5 hours | 200 | 18.5 | 73 | Cooling resumed. |
| 6 hours | 200 | 18.5 | 69 |  |
| 7 hours | 75 | 18.5 | 65 |  |
| 7¼ hours | (¹) | (¹) | 69 |  |

¹ Stopped—chlorination complete.

The charge was then rid of excess reagent, precipitated in boiling water, washed and dried. The chlorinated rubber had a viscosity of 168 centipoises and a chlorine content of 68.0%.

Example 2

Using the charge weights and operating conditions of Example 1, rubber was chlorinated as follows:

| Time | Rate of Cl$_2$ addition | Rate of air addition | Solution temp. | Remarks |
|---|---|---|---|---|
|  | Parts/hour | Parts/min. | ° C. |  |
| 0 hour | 170 |  | 49 | Cooling water on jacket. |
| 1 hour | 225 |  | 60 |  |
| 2 hours | 225 |  | 70 |  |
| 3 hours | 225 |  | 73 | Jacket cooling stopped at first sign of temperature drop. Reduced temperature period about ½ hour. |
| 3¾ hours | 225 | 29.7 | 68 |  |
| 4 hours | 200 | 29.7 | 70 |  |
| 4¼ hours | 150 | 29.7 | 71 |  |
| 5 hours | 150 | 29.7 | 75 | Cooling resumed. |
| 6 hours | 150 | 29.7 | 69 |  |
| 7¼ hours | 50 | 29.7 | 70 |  |
| 8 hours | (¹) | (¹) | 70 |  |

¹ Chlorination complete.

The chlorinated rubber was precipitated in boiling water, washed and dried. It had a viscosity of 12 centipoises and a chlorine content of 68.5%.

Example 3

Again proceeding as in Example 1, a rubber chlorination was carried out according to the following schedule:

| Time | Rate of Cl$_2$ addition | Rate of air addition | Charge temp. | Remarks |
|---|---|---|---|---|
|  | Parts/hour | Parts/min. | ° C. |  |
| 0 hour | 225 |  | 52 | Jacket cooled. |
| 1 hour | 225 |  | 63 |  |
| 2 hours | 225 |  | 66 |  |
| 3 hours | 225 |  | 70 |  |
| 4 hours | 225 |  | 70 |  |
| 4½ hours | 175 | 29.7 | 66 | Viscosity reduction started. Cooling stopped. |
| 5 hours | 200 | 29.7 | 76 | Cooling resumed. Reduced temperature period about ¾ hours. |
| 5¾ hours | 150 | 29.7 | 73 |  |
| 6 hours | 150 | (¹) | 68 | Viscosity at desired level. |
| 7 hours | (²) | (²) |  |  |

¹ Air shut off.
² Chlorination complete.

The chlorinated rubber was precipitated, washed and dried. The product had a viscosity of 18 centipoises and a chlorine content of 68.6%.

The process in accordance with this invention is applicable to the chlorination of rubber in solution in an inert solvent, the rubber constituting 1–6% by weight of the solution. Rubber in the form of white crepe, smoked sheet or the like is suitable. Preferably, the rubber is milled or otherwise treated to reduce its viscosity and improve its solubility. Preferably, the rubber is digested or otherwise treated to improve its chlorination properties, for example, as described in U. S. Patent 2,252,728, issued to J. M. Peterson.

The rubber is dissolved to form a more or less mobile solution. The solution may be formed at about 64° C. or may be formed at a lower temperature and heated to above 64° C. Conveniently, the solution is heated to the desired temperature by the heat of reaction produced by addition of chlorine, effective cooling being applied only after the temperature is in the 64–76° C. range. The temperature is then held at at least 64° C. during the remainder of the first stage reaction (i. e., at least the second half of the first stage) to insure maintenance of a uniform single phase system which is readily agitated and absorbs chlorine well. The temperature is held at below 76° C., preferably below 72° C., as at higher temperatures the chlorination is very much slower, possibly due to poor solubility for chlorine.

Cooling is carried out to the extent required to hold the temperature at 64–76° C. Preferably, any solvent vapors formed are condensed and returned to the solution. Such return constitutes one form of cooling. Cooling is usually carried out at least to the critical point indicated by a rapid drop in temperature. It will be immediately discontinued where a very low viscosity product is desired but may be continued to some extent where less reduction in viscosity is desired. Regulation of cooling serves to control the period from the critical point to the regain of temperature and thus regulates viscosity drop.

Upon reaching the critical point or shortly thereafter, the rate of chlorine addition is usually reduced and addition of oxygen is started. The time during which the oxygen is added will vary anywhere from five minutes to eight hours and usually from about one hour to three hours. The oxygen will usually be added in the form of air, but it may be added in other free gaseous forms such as, for example, pure oxygen or ozone.

The rate of flow of chlorine into the solution will usually vary during the different stages of the chlorination, and with the chlorination of different batches of rubber. Thus, for example, the flow may be as high as 250 parts per hour or as low as 5 parts per hour per 100 parts of rubber, parts being by weight. Usually, it will be preferable to use a flow within the more limited range of 12 to 90 parts per hour per 100 parts of rubber. Preferably, chlorine will be added at a rate in excess of the rate at which it can be absorbed in the various stages.

Likewise the flow of oxygen or air may be varied widely between about 0.5 and about 25 parts of air per minute per part of rubber, preferably between 2.5 and 10 parts of air per 100 parts of rubber, parts being by weight. Preferably, the quantity will be sufficient to cause the desired viscosity drop by the time chlorination is complete. It is to be understood that when gases containing a higher oxygen content than air are used, the flow of oxygen-containing gas will be reduced proportionately. Thus, using pure oxygen, quantities are one-fifth those when using air. The quantity of air added influences the viscosity drop as a direct function. Air is therefore regulated in quantity to control viscosity drop to a predetermined value.

The oxygen addition is highly effective to reduce viscosity in the chlorination at 64–76° C. only after the critical point is reached. It adversely affects efficiency of the chlorination operation prior to that time. Addition may be commenced at any time after the reaction first departs from its original strongly exothermic nature. The oxygen preferably is added concurrently with chlorine to obtain early completion of the reaction, the rate of chlorine addition being reduced. The chlorine may be shut off during part or all of the time oxygen is added but this greatly extends the operation. The oxygen addition is usually continued until the chlorination process has been completed, but if the desired viscosity is attained before chlorination is complete, the oxygen may be shut off and the chlorination continued without oxygen. In any case, chlorination is continued until the desired chlorine content, which must be above 64% for a stable product, is obtained.

The temperature of the solution during the second stage will in most cases remain in the 64–76° C. range. However, it may drop below 64° C. following the critical point until regain of the temperature drop by heat of reaction brings it above 64° C. Thus, in the second stage, the temperature will be above 60° C. and generally 64–76° C., any drop below 64° C. being for a relatively short period. In general, temperature will be brought to the level of the first stage reaction, the period of temperature regain being controlled so that its length is in inverse function of the viscosity drop desired. Temperatures lower than the range mentioned cause chlorination and viscosity reduction to be slower in the second reaction stage; temperatures above 76° C. also cause slower chlorination.

Upon completion of the chlorination, the product is recovered from the reaction solution. This may be accomplished by precipitation, for example, in boiling water or steam, or by evaporation of all volatile materials present, usually then thoroughly washing the product and drying it.

The rubber may be chlorinated in solution in inert solvents other than carbon tetrachloride, for example, in chloroform, benzene, and ethylene dichloride, air or oxygen being utilized as hereinabove described when the partially chlorinated rubber has reached a chlorine content between 45% and 59%. The change in reaction is less marked, in general, and not in all cases clearly discernable with such solvents, chlorine content being relied upon to determine oxygen addition.

By utilizing the process herein disclosed, it is possible to produce extremely low viscosity chlorinated rubber. It is to the production of this very low viscosity chlorinated rubber of less than 20 centipoises that the process is mainly directed since it permits rapid and effective viscosity reduction without injury to the product. However, the close control permitted by the process makes it useful for the preparation of chlorinated rubber in excess of 20 centipoises, for example, as high as 200 centipoises, to obtain a product of a definite predetermined viscosity.

The process in accordance with this invention provides an improved product reduced in corrosive tendencies of solutions. It further permits production of very low viscosity chlorinated rubber in a shorter time than methods operating at lower or higher temperature. Rapid reduction of viscosity within the chlorination period makes reduction after chlorination unnecessary leading to a product improved in uniformity and in compatibility with resins.

What I claim and desire to protect by Letters Patent is:

1. A process for the manufacture of chlorinated rubber which comprises chlorinating rubber dissolved in a solvent substantially inert to chlorine in a first reaction stage in which the temperature of the solution is maintained at between 64° C. and 76° C. until the chlorine content of the resulting partially chlorinated rubber is between 45% and 59%, passing gas containing free oxygen into the solution in a following reaction stage in which the temperature of tne solution is maintained at above 60° C. but not above 76° C. to lower the viscosity of the chlorinated rubber to a level such that the completely chlorinated rubber ultimately recovered is at a predetermined viscosity, further chlorinating the solution in the said second stage until the chlorinated rubber has a chlorine content of at least 64%, and recovering the chlorinated rubber from the resulting solution.

2. A process for the manufacture of chlorinated rubber which comprises chlorinating a solution of rubber in carbon tetrachloride in a first reaction stage in which the temperature is maintained at between 64° C. and 76° C. until the chlorine content of the partially chlorinated rubber is between 45% and 59% and a decrease in chlorine absorbing ability accompanied by a drop in temperature indicates completion of the said stage, passing gas containing free oxygen into the solution in a following reaction stage in which the temperature of the solution is maintained at above 60° C. but not above 76° C. to lower the viscosity of the chlorinated rubber to a level such that the completely chlorinated rubber ultimately recovered is at a predetermined viscosity, further chlorinating the solution in the said second stage until the chlorinated rubber has a chlorine content of at least 64%, and recovering the chlorinated rubber from the resulting solution.

3. A process for the manufacture of chlorinated rubber which comprises chlorinating a 1-6% solution of rubber in carbon tetrachloride in a first reaction stage in which the temperature is maintained at between 64° C. and 76° C. until the chlorine content of the partially chlorinated rubber is between 45% and 59% and a decrease in chlorine absorbing ability accompanied by a drop in temperature indicates completion of the said stage, passing gas containing free oxygen concurrently with chlorine into the solution in a following reaction stage at above 60° C. but not above 76° C. to lower the viscosity of the chlorinated rubber to a level such that the completely chlorinated rubber ultimately recovered is at a predetermined viscosity, continuing chlorination of the solution in the said second stage until the chlorine content of the chlorinated rubber is at least 64%, and recovering the chlorinated rubber from the resulting solution.

4. A process for the manufacture of chlorinated rubber which comprises chlorinating a 1-6% solution of rubber in carbon tetrachloride in a first reaction stage in which the temperature is maintained at between 64° C. and 76° C. until the chlorine content of the partially chlorinated rubber is between 45% and 59% and a decrease in chlorine absorbing ability accompanied by a drop in temperature indicates completion of the said stage, passing air and chlorine into the solution in a second reaction stage at a solution temperature maintained substantially throughout the second stage at between 64° C. and 76° C. until the chlorine content of the resulting chlorinated rubber is at least 64%, the quantity of air passed into the solution and the period for regain of the temperature drop marking the end of the first stage being of an amount and length to lower the viscosity of the chlorinated rubber to a desired predetermined level, and recovering the resulting chlorinated rubber from the solution.

EDWIN B. SPAULDING.